Patented Nov. 10, 1953

2,658,893

UNITED STATES PATENT OFFICE 2,658,893

PREPARATION OF HALODIAMINOTRIAZINES

John J. Roemer, Stamford, and Donald W. Kaiser, Old Greenwich, Conn., assignors to American Cyanamid Company, New York, N. Y., a corporation of Maine No Drawing. Application September 16, 1950
Serial No. 185,338

10 Claims. (Cl. 260—249.8)

1

The present invention relates to certain halodiamino-s-triazines and their preparation.

It is an object of this invention to prepare certain halo-diamino-s-triazines by reacting a dicyanoguanidine with a halogen acid under novel conditions. The products so made are useful as intermediates in the preparation of dyes, pharmaceuticals, and synthetic resins. Additional objects will be apparent from the discussion hereinafter.

In its simplest aspect, the invention contemplates reacting at least one mole of halogen acid with one mole of a free dicyanoguanidine, whereby the dicyanoguanidine is cyclized to the corresponding 2-halo-4,6-diamino-s-triazine. This is conveniently done by passing a dry hydrogen halide into a dry solution of the dicyanoguanidine, as shown in Example 2. If instead of using a dry hydrogen halide, an aqueous solution thereof is used, care must be taken to avoid the formation of undesirable by-products. This may be prevented by carrying out the reaction below 40° and preferably below 10° C. as shown in Example 1. This temperature restriction, however, does not apply when using a non-aqueous solvent, and in the latter case the reaction temperature can be considerably higher, as shown in Example 2. Of course, excessively high temperatures are not preferred with non-aqueous solvents owing to the inherent instability of dicyanoguanidine and its tendency to polymerize at higher temperatures, e. g., about 125° C.

It will be understood that when a dicyanoguanidine is used as the salt instead of as a free dicyanoguanidine, at least two equivalents of hydrogen halide must be used, one to liberate the acidic dicyanoguanidine from the salt (for example, potassium dicyanoguanidine) and one to effect ring closure. When a polyvalent salt, such as zinc or calcium dicyanoguanidine, is used, the amount of hydrogen halide must be correspondingly increased to combine with the calcium or other cationic substituent.

While it is possible to obtain the halo diamino triazines in fair yield using only 1 equivalent of halogen acid per equivalent of free dicyanoguanidine, it is preferred when using aqueous acid to use about 5–9 moles of acid per mole of free dicyanoguanidine, or 6–10 moles of acid per mole of monovalent dicyanoguanidine salt, such as the potassium salt.

As above stated, when carrying out the reaction with aqueous acid it is necessary to keep the temperature below about 40° C. to avoid the formation of large amounts of by-products, and

2 it is further preferred when using aqueous acid to conduct the reaction at considerably lower temperatures, namely 0–10° C. In the preferred modification of the reaction, using aqueous acid, the materials are brought together at 0–5° C. and then allowed to warm slowly to room temperature, while stirring, without further refrigeration unless the temperature rises above 30° C., in which event the reaction mass is preferably cooled to keep the temperature below 30° C.

The mono- and di-aliphatic and mono- and di-aralkyl dicyanoguanidines undergo the same reaction with the halogen acids to form the corresponding 2-halo-4-substituted amino-6-amino-s-triazine. Accordingly in its broad aspect the invention contemplates reacting dicyanoguanidine, mono- and di-aliphatic dicyanoguanidines, mono- and di-cycloaliphatic dicyanoguanidines, and mono- and di-aralkyl dicyanoguanidines with halogen acid under the herein prescribed conditions to form a compound of the formula

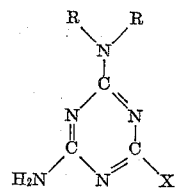

in which X is halogen and R is hydrogen or an aliphatic, cycloaliphatic, or aralkyl radical. The R's may be the same or different. Examples of suitable radicals are methyl, ethyl, propyl, isopropyl, butyl, isobutyl, amyl, hexyl, dodecyl, 2-ethylhexyl, cyclohexyl, benzyl, xylyl, phenylethyl, phenylpropyl, mesitylyl, cumyl, and the like.

The substituted dicyanoguanidines can be made by the general method of U. S. Patent No. 2,371,100, using the corresponding substituted dicyandiamide, which in turn can be made by the general method of U. S. Patent 2,455,807.

The following examples illustrate without limiting the invention.

*Example 1*

Dicyanoguanidine ___ 10.0 g. (approx.) (0.1 mole)
Hydrochloric acid
 (conc.) _____ 90 g. (0.9 mole)

The dicyanoguanidine was added to the hydrochloric acid within 5 minutes at 0°–5° C. The reaction mixture was held at this temperature for the first 15 minutes to control the exothermic reaction and then allowed to warm spontaneously to about room temperature to increase the yield somewhat. A maximum temperature of 27° C. was reached in approximately 1½ hours, after which the reaction mixture was filtered, washed, rinsed with acetone and dried. The yield of chlorodiaminotriazine was 13.1 grams (90% yield).

*Example 2*

Potassium dicyanoguanidine __ 14.7 g. (0.1 mole)
Acetone _____ 250 cc.

The potassium dicyanoguanidine was suspended in the acetone and stirred rapidly as hydrogen chloride gas was introduced above the surface of the reaction mixture. At a reaction temperature of 23°–28° C. 9 grams of hydrogen chloride was taken up by the reaction mixture in one half hour. The crude product, containing potassium chloride, was filtered; rinsed with acetone and extracted with four 50 cc. portions of water leaving 11.6 grams of crude chlorodiamino triazine.

When the above reaction was carried out at reflux (56°–58° C.) the same amount of hydrogen chloride was taken up by the reaction mixture in the same length of time and the yield of crude chlorodiaminotriazine was the same (11.6 grams).

*Example 3*

Potassium dicyanoguanidine _____ 14.7 g. (0.1 mole)
Hydrochloric acid (conc.) (100 gr.) _____ 85.5 cc. (1.0 mole)

The hydrochloric acid was cooled to 0° C. and the potassium dicyanoguanidine was added in five minutes at 0°–5° C. The reaction mixture was held at this temperature for the first 15 minutes and then allowed to warm spontaneously as in Example 1. In approximately 1½ hours a maximum temperature of 25.5° C. was recorded. Thereafter the reaction mixture was filtered and the precipitate washed with five 25 cc. portions of water. On rinsing with acetone and drying, 14.49 grams (99.5% yield) of chlorodiaminotriazine was obtained.

*Example 4*

Potassium dicyanoguanidine _____ 14.7 g. (0.1 mole)
Hydrobromic acid 48%_ 169 grams (1.0 moles)

The hydrobromic acid was cooled to 0° C. and the potassium dicyanoguanidine was added within 5 minutes at 0°–5° C. The reaction mixture was held at this temperature for 15 minutes and then allowed to warm spontaneously as in Example 1. In approximately 1½ hours a maximum temperature of 24° C. was recorded. Thereafter the reaction mixture was filtered and the precipitate washed with five 25 cc. portions of water, rinsed with acetone, and dried. A yield of 15.45 g. (81.3%) of bromodiaminotriazine was obtained as a white powder.

*Example 5*

Potassium dicyanoguanidine _____ 14.7 grams (0.1 mole)
Hydriodic acid 47.3% ____ 271 grams (1.0 mole)

The hydriodic acid was cooled to 0° C. and the potassium dicyanoguanidine was added within 5 minutes at 0°–5° C. After keeping the reaction at this temperature for 15 minutes it was allowed to warm spontaneously to approximately room temperature (about one hour), after which the reaction mixture was filtered. The precipitate was washed with five 25 cc. portions of water, rinsed with acetone and dried. A yield of 19.29 grams (81.4%) of iododiaminotriazine was obtained as a white powder which became light yellow and darkened further on standing.

When the above experiment was repeated using 0.5 mole of hydriodic acid a 92.7% yield of light tan iododiaminotriazine was obtained.

Preparation of the substituted halo diaminotriazines is shown in the following examples.

*Example 6*

Sodium cyclohexyl dicyanoguanidine _____ 8.52 grams (0.04 mole)
Hydrochloric acid (conc.) (40 gr.) _____ 34.2 cc. (0.4 mole)

The sodium cyclohexyl dicyanoguanidine was added to the acid within 5 minutes at 0°–5° C. After 15 minutes at this temperature the reaction mixture was allowed to warm spontaneously. A maximum temperature of 28° C. was recorded in approximately 1 hour. The reaction mixture was filtered, and the precipitate was washed with five 15 cc. portions of water, rinsed with acetone and dried. A yield of 5.6 grams (61.5%) of 2-chloro-4-cyclohexylamino-6-amino-s-triazine was obtained.

*Example 6-a*

The sodium cyclohexyl dicyanoguanidine of Example 6 was prepared as follows, in accordance with the general method of U. S. Patent 2,371,100.

1-cyclohexyldicyandiamide  82.5 g. (0.5 mole)
Sodium hydroxide _____  41 g. (1.0 mole)
Cyanogen chloride _____  25.5 ml. (0.5 mole)
Acetone _____  500 ml.

After stirring the acetone solution of the 1-cyclohexyldicyandiamide and sodium hydroxide pellets for 30 minutes to form the sodium salt of the cyclohexyldicyandiamide, the cyanogen chloride vapor was added to the slurry at a temperature of 10° C. Stirring was continued an hour after addition and filtration gave 41.8 g. of solid which consisted of sodium chloride contaminated with a slight quantity of sodium cyanate. The bulk of the acetone was distilled from the filtrate and the residual acetone solution was placed in an evaporating dish until the following day. Filtration of the syrupy mass gave 68 g. of yellow, crystalline solid which corresponded to a 63.8% yield of sodium cyclohexyldicyanoguanidine which melted at 257° C. with decomposition after crystallization from alcohol.

*Example 7*

Potassium butyl dicyanoguanidine _____ 10.15 gr. (0.05 mole)
Hydrochloric acid (conc.) (50 gr.) _____ 43 cc. (0.5 mole)

This experiment was carried out the same as in Example 6. A maximum temperature of 27° was recorded in approximately 1½ hours. The yield of 2-chloro-4-butylamino-6-amino-s-triazine was 4.79 gr. or 47.9%.

*Example 7-a*

The butyl potassium dicyanoguanidine of Example 7 was prepared as follows, in accordance with the general method of U. S. Patent 2,371,100.

1-butyldicyandiamide _____ 130 g. (1 mole)
Potassium hydroxide _____ 128 g. (2 moles)
Cyanogen chloride _____ 51 ml. (1 mole)
Acetone _____ 1 l.

The crude butyldicyandiamide was not entirely soluble in acetone, so the small amount of insoluble material was filtered from the solution. Addition of potassium hydroxide pellets to the acetone filtrate and vigorous stirring gave a heavy precipitate of the potassium salt. The cyanogen chloride was then added as a vapor at 10° C. and after stirring for an additional hour 146 g. of insoluble material was filtered from the reaction mixture. From this mixture of product and potassium chloride was obtained 60 g. of the potassium salt of butyl dicyanoguanidine by crystallization from hot water.

Example 8

| | |
|---|---|
| Potassium benzyl dicyanoguanidine | 23.7 g. (0.1 mole) |
| Hydrochloric acid (conc.) 100 g. | 85.5 cc. (1.0 mole) |

This experiment was carried out in the same manner as in Example 6 above except that the acetone rinse was omitted. A maximum temperature of 29° was recorded in approximately 1 hour. The yield of 2-chloro-4-benzylamino-6-amino-s-triazine was 14.85 g. or 63.2%.

Example 8-a

The potassium benzyl dicyanoguanidine of Example 8 can be prepared as follows, in accordance with the general method of U. S. Patent 2,371,100.

| | |
|---|---|
| 1-benzyldicyandiamide | 87 g. (0.5 mole) |
| Potassium hydroxide | 64 g. (1.0 mole) |
| Cyanogen chloride | 25.5 g. (0.5 mole) |
| Acetone | 500 ml. |

The potassium salt of the benzyldicyandiamide separated when the potassium hydroxide pellets were added to the acetone solution of the benzyldicyandiamide. After stirring for 30 minutes the mixture was cooled at 10° C. and the cyanogen vapor added while the temperature was maintained below 10° C. The addition required 2 hours and the mixture was stirred for another hour, the solid filtered, washed with acetone and dried. The solid, including the potassium chloride, weighed 152 g., which represented 87.3% crude yield. Crystallization from 250 ml. of hot water gave 54 g. of colorless crystals, which corresponded to a 46% purified yield.

The products of Examples 6, 7 and 8 are new compounds and are useful as intermediates in making pharmaceuticals, dyes, and synthetic resins. The corresponding bromo and iodo derivatives can be made in the same way, using HBr and HI instead of HCl.

While the invention has been described with particular reference to specific embodiments, it is to be understood that it is not to be limited thereto but is to be construed broadly and restricted solely by the scope of the appended claims.

We claim:

1. The reaction that consists in subjecting a member of the group consisting of dicyanoguanidine, alkyl substituted dicyanoguanidines, cycloalkyl substituted dicyanoguanidines, aralkylhydrocarbon substituted dicyanoguanidines, and metal salts thereof to the action of a hydrogen halide, the mole ratio of hydrogen halide to the said dicyanoguanidine (free basis) being at least 1.1, provided that when using an aqueous solvent for the reaction, the temperature is within the range of about 0°–40° C., whereby the corresponding halodiamono-s-triazine is formed, and separating the thus-formed triazine.

2. The method according to claim 1 in which the reaction is conducted in an inner solvent under anhydrous conditions.

3. The method according to claim 1 in which the reaction is conducted in an aqueous solvent at a temperature of about 0°–30° C.

4. The method according to claim 3 in which the halogen acid is hydrochloric acid and the dicyanoguanidine is used in the form of its alkali metal salt.

5. The method according to claim 4 in which the alkali metal salt is the potassium salt.

6. The method according to claim 5 in which the halogen acid is hydrochloric acid.

7. The method according to claim 6 in which the mole ratio of hydrochloric acid to the potassium dicyanoguanidine is at least 5:1.

8. The reaction that consists in subjecting potassium benzyl dicyanoguanidine to the action of hydrochloric acid in the approximate mole ratio of 1:5, at a temperature of about 0°–30° C. whereby 2-chloro-4-benzylamino-6-amino-s-triazine is formed, and separating thus-formed triazine.

9. The reaction that consists in subjecting potassium butyl dicyanoguanidine to the action of hydrochloric acid in the approximate mole ratio of 1:5, at a temperature of about 0°–30° C. whereby 2-chloro-4-butylamino-6-amino-s-triazine is formed, and separating the thus-formed triazine.

10. The reaction that consists in subjecting potassium cyclohexyl dicyanoguanidine to the action of hydrochloric acid in the approximate mole ratio of 1:5, at a temperature of about 0°–30° C. whereby 2-chloro-4-cyclohexylamino-6-amino-s-triazine is formed, and separting the thus-formed triazine.

JOHN J. ROEMER.
DONALD W. KAISER.

References Cited in the file of this patent

UNITED STATES PATENTS

| Number | Name | Date |
|---|---|---|
| 2,371,100 | Kaiser | Mar. 6, 1945 |
| 2,392,607 | Nagy | Jan. 8, 1946 |
| 2,392,608 | Nagy | Jan. 8, 1946 |

FOREIGN PATENTS

| Number | Country | Date |
|---|---|---|
| 252,530 | Switzerland | Oct. 16, 1948 |
| 261,813 | Switzerland | Sept. 1, 1949 |
| 261,817 | Switzerland | Sept. 1, 1949 |